(12) United States Patent
Schnurr et al.

(10) Patent No.: US 9,805,522 B2
(45) Date of Patent: Oct. 31, 2017

(54) METHOD FOR PLANNING A VEHICLE DIAGNOSIS

(71) Applicant: Robert Bosch GmbH, Stuttgart (DE)

(72) Inventors: Rainer Schnurr, Stuttgart (DE); Udo Schulz, Vaihingen/Enz (DE); Uta Fischer, Gerlingen (DE)

(73) Assignee: Robert Bosch GMBH, Stuttgart (DE)

( * ) Notice: Subject to any disclaimer, the term of this patent is extended or adjusted under 35 U.S.C. 154(b) by 319 days.

(21) Appl. No.: 14/410,775

(22) PCT Filed: Jun. 6, 2013

(86) PCT No.: PCT/EP2013/061679
§ 371 (c)(1),
(2) Date: Dec. 23, 2014

(87) PCT Pub. No.: WO2014/001054
PCT Pub. Date: Jan. 3, 2014

(65) Prior Publication Data
US 2015/0206360 A1 Jul. 23, 2015

(30) Foreign Application Priority Data

Jun. 27, 2012 (DE) .................. 10 2012 210 963
Jun. 28, 2012 (DE) .................. 10 2012 211 189

(51) Int. Cl.
*G07C 5/08* (2006.01)
*B60W 50/00* (2006.01)
(Continued)

(52) U.S. Cl.
CPC ....... *G07C 5/0808* (2013.01); *B60W 50/0097* (2013.01); *B60W 50/04* (2013.01);
(Continued)

(58) Field of Classification Search
CPC combination set(s) only.
See application file for complete search history.

(56) References Cited

U.S. PATENT DOCUMENTS

| 5,377,484 A * | 1/1995 | Shimizu | ................ F01N 11/007 123/292 |
| 5,423,203 A * | 6/1995 | Namiki | ............... F02D 41/1495 123/688 |

(Continued)

FOREIGN PATENT DOCUMENTS

| DE | 10 2008 000911 | 10/2009 |
| DE | 10 2008 025569 | 12/2009 |

(Continued)

OTHER PUBLICATIONS

International Search Report for PCT/EP2013/061679, dated Aug. 2, 2013.

*Primary Examiner* — Thomas G Black
*Assistant Examiner* — Ana Thomas
(74) *Attorney, Agent, or Firm* — Norton Rose Fulbright US LLP; Gerard Messina

(57) ABSTRACT

A method for planning a vehicle diagnosis in a vehicle includes: estimation of an operating characteristic of the vehicle on a route to be traveled by the vehicle; and planning of the vehicle diagnosis based on a probability that the estimated operating characteristic of the vehicle will correspond to an operating characteristic suitable for the vehicle diagnosis.

11 Claims, 5 Drawing Sheets

(51) Int. Cl.
  *B60W 50/04*   (2006.01)
  *F01N 3/10*    (2006.01)
  *F01N 11/00*   (2006.01)
  *G01C 21/34*   (2006.01)
  *F02D 41/14*   (2006.01)
  *F02D 41/22*   (2006.01)

(52) U.S. Cl.
  CPC ............... *F01N 3/10* (2013.01); *F01N 11/00* (2013.01); *G01C 21/34* (2013.01); *B60W 2050/041* (2013.01); *B60W 2530/14* (2013.01); *B60W 2550/14* (2013.01); *B60W 2550/20* (2013.01); *B60W 2550/402* (2013.01); *F01N 2900/12* (2013.01); *F02D 41/1495* (2013.01); *F02D 41/22* (2013.01); *F02D 2200/701* (2013.01); *F02D 2200/702* (2013.01); *Y02T 10/47* (2013.01); *Y02T 10/84* (2013.01)

(56) References Cited

U.S. PATENT DOCUMENTS

| | | | | |
|---|---|---|---|---|
| 5,488,858 | A * | 2/1996 | Achleitner | F02D 41/1495 73/1.06 |
| 6,532,734 | B1 * | 3/2003 | Nader | F01N 11/007 60/274 |
| 6,804,951 | B2 * | 10/2004 | Nader | F01N 11/007 60/274 |
| 8,027,763 | B2 * | 9/2011 | Webster | G07C 5/0808 701/33.9 |
| 8,423,226 | B2 * | 4/2013 | Underdal | G06N 7/005 701/31.4 |
| 2002/0161495 | A1 * | 10/2002 | Yamaki | G01M 15/05 701/33.8 |
| 2003/0055578 | A1 * | 3/2003 | Hartz | F02D 41/187 702/35 |
| 2006/0224283 | A1 * | 10/2006 | Fussey | F02D 41/22 701/31.4 |
| 2008/0314023 | A1 * | 12/2008 | Pohmerer | F01N 11/007 60/285 |
| 2011/0082622 | A1 | 4/2011 | Wehmeier et al. | |
| 2011/0224868 | A1 * | 9/2011 | Collings, III | B60L 11/1857 701/33.4 |
| 2013/0342368 | A1 * | 12/2013 | Nathanson | G07C 5/008 340/903 |
| 2015/0375735 | A1 * | 12/2015 | Fischer | B60W 50/0097 701/22 |

FOREIGN PATENT DOCUMENTS

| | | | | |
|---|---|---|---|---|
| DE | 10 2009 028374 | | 2/2011 | |
| DE | 10 20069 045 376 | | 4/2011 | |
| EP | 0 836 075 A1 | | 4/1998 | |
| EP | 1 606 503 | | 12/2005 | |
| FR | 2 968 352 | * | 1/2010 | ............ F02D 41/22 |
| FR | WO 2012072896 A1 | * | 6/2012 | ............ F02D 41/22 |
| JP | 2003-511601 A | | 3/2003 | |
| JP | 2003-118425 A | | 4/2003 | |
| JP | 2004-108777 A | | 4/2004 | |
| JP | 2008-128080 A | | 6/2008 | |
| WO | 2008/038741 A1 | | 4/2008 | |
| WO | WO 2012/130403 | | 10/2012 | |

* cited by examiner

_METHOD FOR PLANNING A VEHICLE DIAGNOSIS_

BACKGROUND OF THE INVENTION

1. Field of the Invention

The present invention relates to diagnostic systems for vehicles and to methods for planning a vehicle diagnosis.

2. Description of the Related Art

From published German patent application document DE 10 2009 045 376 A1, a method is known for diagnosing the dynamic behavior of an exhaust gas sensor. The disclosed diagnostic method is part of an on-board diagnosis, or OBD, that monitors all systems that influence the exhaust gas in a vehicle during driving operation. Errors that occur can be stored in a storage device and can be read out via standardized interfaces when there is a technical check of the vehicle. In addition, errors that occur can be indicated to the driver of the vehicle via a warning light.

BRIEF SUMMARY OF THE INVENTION

According to a first aspect of the present invention, a method is provided for the temporal planning of a vehicle diagnosis in a vehicle, having the following steps:

estimation of an operating characteristic of the vehicle on a route that is to be traveled by the vehicle; and planning of the vehicle diagnosis based on a probability that the estimated operating characteristic of the vehicle corresponds to an operating characteristic suitable for the vehicle diagnosis.

Here, an operating characteristic is to be understood as the temporal course of one or more operating variables of the vehicle. These operating variables can be for example the load torque of the vehicle, a torque outputted by the internal combustion engine, a wheel rotational speed, a crankshaft rotational speed, the radiator temperature, or any other operating variable in the vehicle on the basis of which inferences can be made concerning the load state of the vehicle. Here, planning is understood to mean, inter alia, a temporal and/or spatial determination of vehicle diagnoses, including operating range changes for creating conditions required for vehicle diagnoses, and the exclusion of vehicle diagnoses.

The indicated method is based on the consideration that during vehicle diagnosis the vehicle should follow a particular operating characteristic so that the vehicle can react with an expected behavior during the vehicle diagnosis. In order for example to check the effectiveness of the lambda probe in a vehicle, the vehicle should follow an operating characteristic in which an incomplete combustion would take place without the lambda probe. In order to achieve this operating characteristic with the vehicle, waiting could take place until the corresponding operating characteristic was achieved by the vehicle on its own, for example if the driver excessively accelerates the vehicle. However, if after a longer period of operation an operating characteristic suitable for the vehicle diagnosis does not arise, the vehicle could be forced into the operating characteristic suitable for carrying out the vehicle diagnosis; however, this would result in correspondingly increased energy consumption and thus correspondingly increased fuel consumption, which is not only economically counterproductive but also damaging to the environment.

In contrast, the idea of the present invention is to estimate the operating characteristic of the vehicle in the future. Through the estimation of when and whether the vehicle will move from pure driving operation to an operating characteristic suitable for the vehicle diagnosis, it is possible to avoid unnecessarily forcing the vehicle to assume a corresponding operating characteristic with increased energy consumption, thus saving fuel and reducing environmental damage.

In a development, the operating characteristic suitable for the vehicle diagnosis is a function of a state of the vehicle that has to fulfill specified conditions for the vehicle diagnosis. The state can be for example an internal state of the vehicle that is influenced by the operating characteristic of the vehicle itself, such as the torque provided by the internal combustion engine, specified by the driver through his behavior. This torque of the internal combustion engine presupposes a specific operating characteristic that in turn can be suitable for the vehicle diagnosis. Further states of the vehicle influenced by the operating characteristic would include operating time and/or no-load time of the vehicle, vehicle speed, and/or engine rotational speed of the vehicle. However, the state can also be an external state to which the vehicle is exposed, such as ambient temperature, air pressure around the vehicle, and/or a particular load state resulting for example when driving uphill, driving downhill, or driving on a flat plane. The vehicle also reacts to these external states with a particular driving characteristic that can be suitable for carrying out the vehicle diagnosis.

The internal and external states can be determined adaptively or predictively in order to estimate the operating characteristic of the vehicle. While an adaptive determination includes an active recognition of the internal and/or external states that are to be expected, for example in a navigation system, and/or includes a vehicle log in the vehicle, a predictive recognition of the internal and/or external states that are to be expected includes an estimation based on concrete boundary conditions that can be acquired for example by a sensor.

The operating characteristic suitable for the vehicle diagnosis can be based on specified minimum times in which the vehicle will have to have been in a specified internal state and/or will have to have been exposed to a specified external state. In this way, it can be ensured that the internal and/or state that forms the basis of the operating characteristic is static and will not change. For example, the temperature of an internal combustion engine of the vehicle changes in the start phase and remains constant only after the internal combustion engine has warmed up to operating temperature. During this warming phase, it would not be suitable to examine the lambda probe in order to determine whether it is operating correctly.

The operating characteristic suitable for the vehicle diagnosis can however also be defined on the basis of a temporal development that is to be expected of the internal and/or external states of the vehicle forming the basis of the operating characteristic. In this way, during the vehicle diagnosis particular operating state points can be initiated that are necessary for a successful vehicle diagnosis.

In a preferred development, the temporal development of the internal and/or external states of the vehicle includes a temporally independent time segment. This preferred development is based on the consideration that as a rule the vehicle diagnosis is carried out based on a control loop that brings a certain degree of disturbance into the vehicle that then has to be regulated out through the systems in the vehicle that are to be examined. Here the disturbance is part of the operating characteristic suitable for the vehicle diagnosis. Such a control loop as a rule entails a dead time, as a result of the regulation path, during which waiting takes place through the temporally independent time segment. By taking into account whether the estimated operating characteristic of the vehicle corresponds to an operating characteristic suitable for the vehicle diagnosis having a corresponding temporally independent development, during the planning of the vehicle diagnosis it can be taken into account whether the vehicle is at all capable during normal operation of producing a step response, based on the introduced disturbance, from which information can be reliably derived about the error-free behavior, or possible malfunctioning, of the vehicle.

In a particularly preferred development, the probability that the estimated operating characteristic of the vehicle corresponds to an operating characteristic suitable for the vehicle diagnosis includes a probability as to whether the operating characteristic suitable for the vehicle diagnosis can be forced to come about using auxiliary aggregates in the vehicle. In this way, during the planning of the vehicle diagnosis a larger degree of freedom in design can be achieved, because smaller expected deviations in the operating characteristic of the vehicle suitable for the vehicle diagnosis can be compensated via these auxiliary aggregates. In principle, all auxiliary aggregates in the vehicle can be used that are suitable for influencing the operating characteristic of the vehicle. Thus, in order to compel the operating characteristic suitable for the vehicle diagnosis in an electrical on-board network, additional electrical consumers, such as a climate control system, can be connected in order to bring about a particular increased load state, or, in a hybrid vehicle, an electric motor can be connected to the internal combustion engine in order to bring about, with the internal combustion engine, a particular reduced load state.

In a further development, the indicated method includes the step of preventing the vehicle diagnosis when the probability that the estimated operating characteristic of the vehicle corresponds to the operating characteristic suitable for the vehicle diagnosis is below a specified threshold value. In this way, during the planning of the vehicle diagnosis for the vehicle all unsuitable path segments on a foreseeable route are deleted ahead of time for which it is clear from the outset that the vehicle diagnosis will not be able to be completed, and therefore will fail.

In an alternative development of the present invention, the indicated method includes the step of reading out the route to be traveled from a navigation device, and estimation of the operating characteristic of the vehicle based on information provided by the navigation device concerning the route to be traveled. This information provided by the navigation device can originate for example from environmental data or traffic data, such as that distributed for example via the Traffic Message Channel service. Thus, for example given a foreseeable traffic jam on a street traveled by the vehicle, vehicle diagnoses can be avoided that would presuppose a high-speed operation of the internal combustion engine of the vehicle. It is also possible to request from the navigation device altitude data, climate data, or any other data concerning the route to be traveled that can be provided by the navigation device.

In another alternative development, the indicated method includes the steps of writing a vehicle log based on a route traveled by the vehicle before traveling the route to be traveled, and estimating the operating characteristic of the vehicle on the route to be traveled by the vehicle based on the written vehicle log. Using the vehicle log, for example route-dependent load data of the internal combustion engine of the vehicle can be noted and used for planning the vehicle diagnosis. If, due to a particular driving behavior of the driver, for example because he commutes daily between his residence and his place of work, it turns out that after a particular number of kilometers traveled a particular load state is always achieved, e.g. because the driver has to stop at a traffic light, this can effectively be used in the planning of the vehicle diagnosis in the vehicle.

In yet another development, the indicated method includes the step of estimation of the operating characteristic of the vehicle based on a near-field sensor attached on the vehicle. With the near-field sensor, obstacles immediately in front of the vehicle that exclude the vehicle diagnosis, or external states suitable for the vehicle diagnosis, can be acquired and used in the planning of the vehicle diagnosis. Thus, a near-field sensor fashioned as a camera can, for example, predict an imminent acceleration on the basis of a sign indicating that the vehicle is leaving a city area, or can predict an imminent braking event based on a slow-moving vehicle. Path segments already released for a vehicle diagnosis can also be retroactively blocked using a near-field sensor, if the near-field sensor detects corresponding circumstances that prevent the vehicle diagnosis, such as a tractor on the roadway traveling slowly in front of the home vehicle.

In an alternative development, the indicated method includes the steps of acquisition of a behavior of a driver of the vehicle and estimation of the operating characteristic of the vehicle based on the behavior of the driver. Thus, for example it can be recognized whether a driver is driving with a comparatively high torque, or is braking strongly over comparatively short stretches. In connection with the above-named collected information, it is then possible to plan a suitable vehicle diagnosis for example shortly before coming to a traffic light, because it can be expected that the driver will brake strongly before this traffic light or will accelerate strongly after the traffic light.

According to a further aspect, a device is provided that is set up to carry out the indicated method. The indicated device can be arbitrarily expanded in order to be capable of carrying out one of the indicated methods as recited in the subclaims.

In a development of the present invention, the indicated device has a storage device and a processor. The indicated method is stored in the storage device in the form of a computer program, and the processor is provided for carrying out the method when the computer program is loaded into the processor from the storage device.

According to a further aspect of the present invention, a vehicle has a device as indicated.

The present invention also relates to a computer program having program code means for carrying out all steps of one of the indicated methods when the computer program is executed on a computer or on one of the indicated devices.

The present invention also relates to a computer program product that contains a program code that is stored on a computer-readable data carrier and that carries out one of the indicated methods when it is executed on a data processing device.

DETAILED DESCRIPTION OF THE INVENTION

Figure 1:
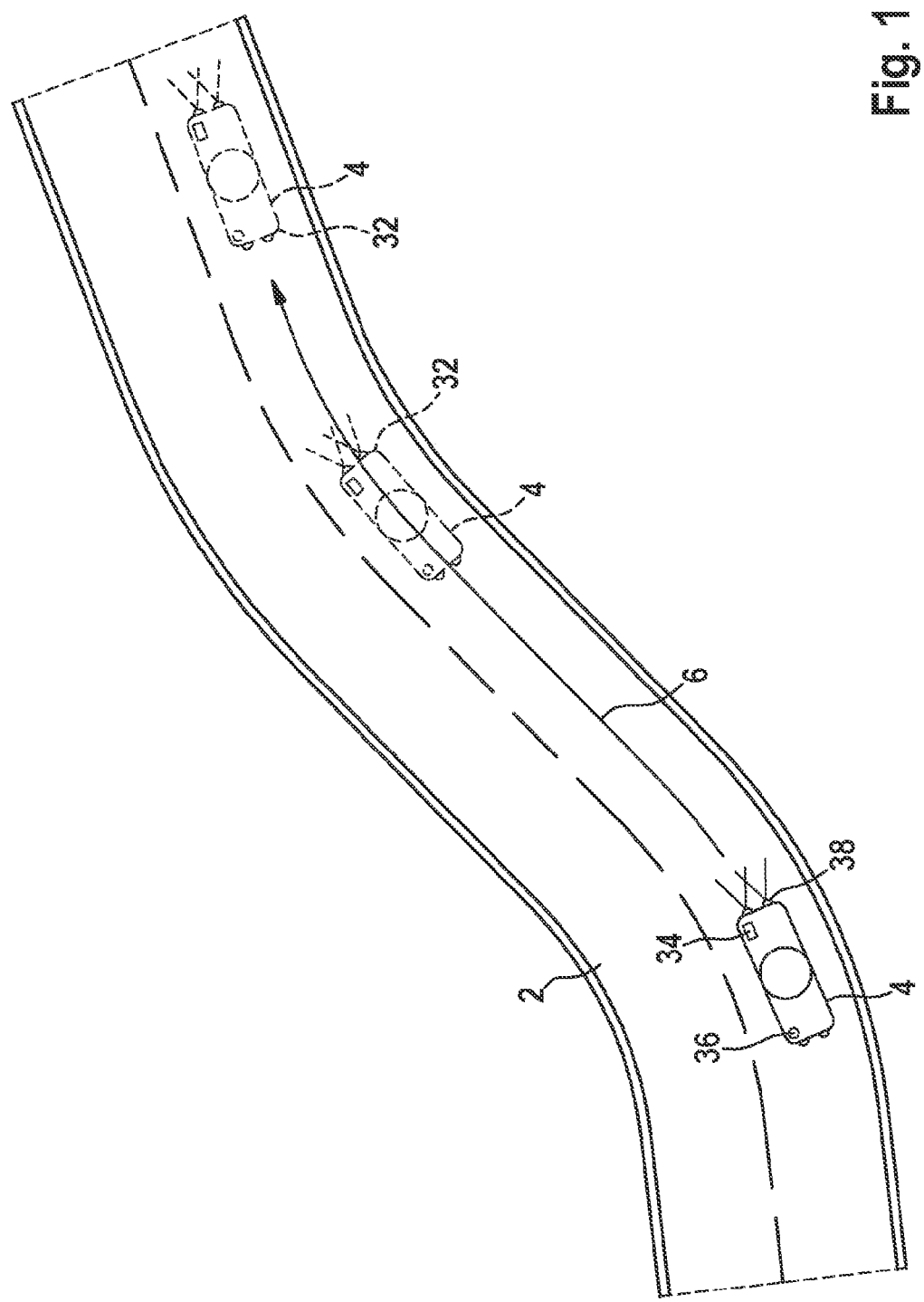
FIG. 1 shows a schematic representation of a vehicle traveling on a roadway.

In the Figures, elements having identical or comparable functions are provided with identical reference characters, and are described only once.

Reference is made to FIG. 1, which shows a schematic representation of a vehicle 4 traveling on a roadway 2.

Vehicle 4 moves along a route 6 on roadway 2. At an assumed first point in time, vehicle 4 is located at a position on roadway 2 at which vehicle 4 is shown in solid lines in FIG. 1. In addition, vehicle 4 is shown in FIG. 1 with dotted lines at a second and at a third position at which, seen from the first point in time, it will be situated at a second and third point in time in the future.

In order to ensure error-free operation of vehicle 2, so-called on-board tests, or OBD tests, are prescribed by law in order to timely recognize an exhaust-gas-related malfunctioning of vehicle 2 and to prevent environmental damage due to the malfunctioning of vehicle 2. Such OBD tests are defined for example by the California Air Resources Board, or CARB. A function required by CARB for the documentation of vehicle diagnoses that are carried out is the Diagnostic In-Use Monitor Performance Ratio, or DIUMPR, whose specification is known to those skilled in the art.

The OBD tests of exhaust gas-related components in vehicle 2 have to be carried out on the basis of test cycles. During the execution of an OBD test, vehicle 2 has to follow a required operating characteristic, for example with regard to a torque of the internal combustion engine. Based on the required operating characteristic, it can be monitored whether the exhaust gas-related components of vehicle 2 react in an error-free way or not. However, during actual driving operation the operating characteristic of vehicle 2 is as a rule always different than the required operating characteristic, so that if the required operating characteristic of vehicle 2 is not maintained during a corresponding OBD test, the test is broken off and an attempt is made to repeat the OBD test the next time vehicle 2 achieves the required operating characteristic.

Figure 2:
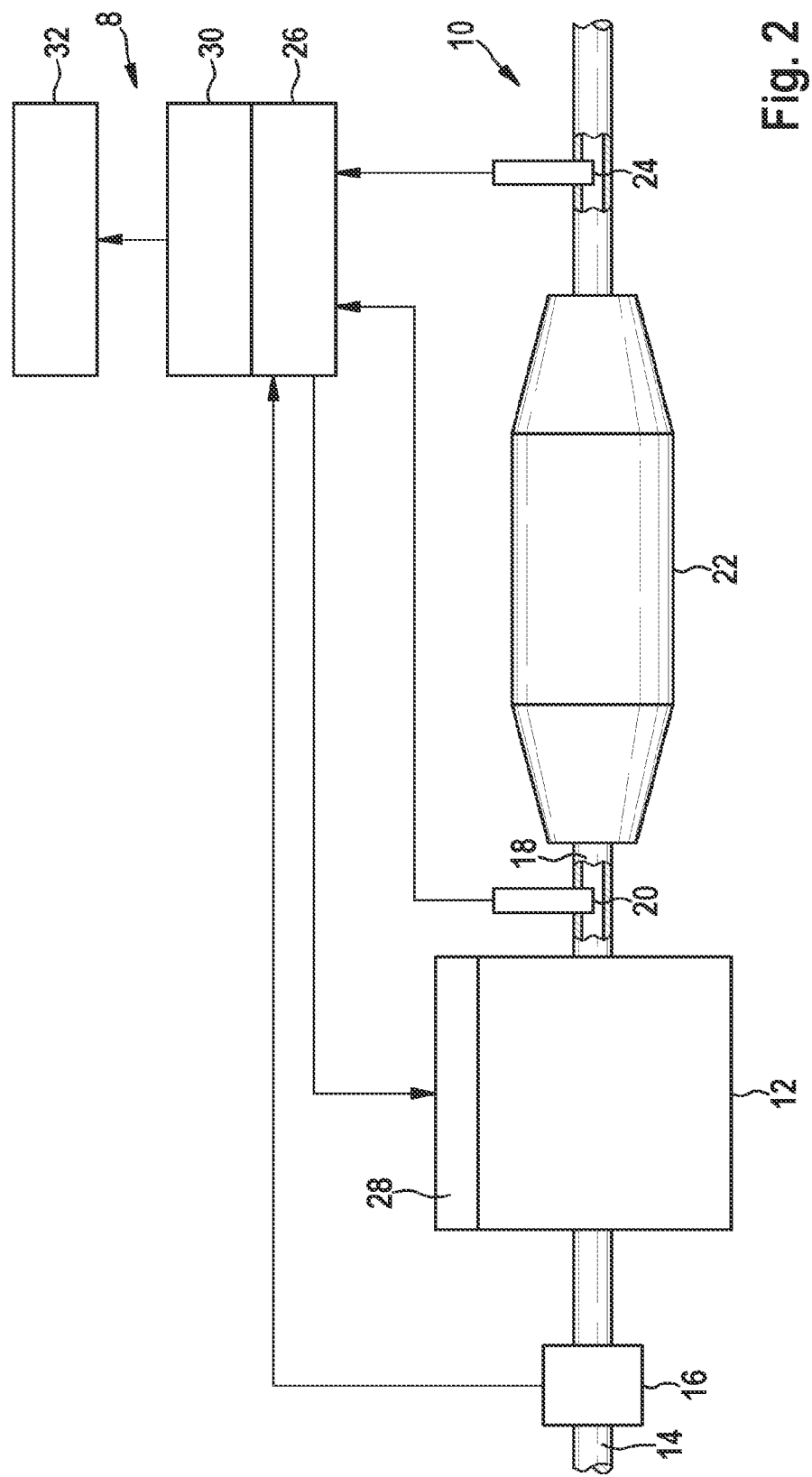
FIG. 2 shows a schematic representation of an example of a vehicle diagnostic system.

FIG. 2 shows a schematic representation of an example of a vehicle diagnostic system 8 suitable for carrying out an OBD test.

Vehicle diagnostic system 8 monitors an internal combustion engine 10 made up of an engine block 12 and an air supply duct 14 that supplies combustion air to engine block 12, the air quantity in air supply duct 14 being capable of being determined using an air supply measurement device 16. The exhaust gas of internal combustion engine 10 is conducted through an exhaust gas cleaning installation having as main component an exhaust gas duct 18 in which there are situated, in the direction of flow of the exhaust gas, a first exhaust gas sensor 20 before a catalytic converter 22 and a second exhaust gas sensor 24 after catalytic converter 22.

The two exhaust gas sensors 20, 24 are connected to control device 26, called an engine electronics system, that calculates the mixture from the data of exhaust gas sensors 20, 24 and the data of air supply measuring device 16, and controls a fuel metering device 28 for the metering of fuel.

Coupled to control device 26, or integrated therein, is a diagnostic device 30 with which the signals of exhaust gas sensors 20, 24 can be evaluated. Diagnostic device 30 can additionally be connected to a display/storage unit 32 on which the evaluation results from diagnostic device 30 can be represented or stored.

Using first exhaust gas sensor 20 situated in exhaust gas duct 18 behind engine block 12, with the aid of control device 26 a lambda value can be set that is suitable for the exhaust gas cleaning system in order to achieve an optimal cleaning effect. Second exhaust gas sensor 24, situated in exhaust gas duct 18 behind catalytic converter 22, can also be evaluated in control device 26, and is used, in a known method, to determine the oxygen storage capacity of the exhaust gas cleaning system.

In the present embodiment, only one internal combustion engine 10 is shown, having only one exhaust gas duct 18. The indicated method for planning a vehicle diagnosis in a vehicle however also extends to vehicles having internal combustion engines 10 that have multi-bank exhaust gas systems in which the cylinders are combined into a plurality of groups and the exhaust gas of the various cylinder groups is conducted into separate exhaust gas ducts 18, in each of which there is installed at least one exhaust gas sensor.

For the normal operation of internal combustion engine 10, in control device 26 there is provided a linear lambda regulation algorithm. First exhaust gas sensor 20, fashioned as a broadband lambda probe, determines the oxygen content in the exhaust gas and forms a corresponding output signal that is supplied to control device 26. This device forms therefrom the regulator manipulated quantities for fuel metering device 28 and for throttle devices, present in air supply duct 14, for setting the supplied quantity of air so that internal combustion engine 10 is operated with a specified lambda value, i.e. a specified air-fuel ratio. For an optimized exhaust gas post-treatment in catalytic converter 22, realized as a three-way catalytic converter, operation at a $\lambda$ of 1 is provided. Constantly operating first exhaust gas sensor 20, in connection with a linear lambda regulation algorithm implemented in the control device, enables the continuous adjustment of the regulator manipulated quantities without a superposed periodic oscillation.

When a two-point regulating algorithm is used as linear lambda regulating algorithm, the $\lambda$ in the exhaust gas oscillates between two specified boundary values. When the $\lambda$ reaches a lower boundary value, assigned to a rich air-fuel mixture, the two-point regulation algorithm sets the regulator manipulated quantities for fuel metering device 28 and the throttle devices in such a way that a modification of the air-fuel ratio takes place to a leaner setting, i.e. an excess of air. If in this way the $\lambda$ reaches the upper boundary value, assigned to a lean air-fuel mixture, then the two-point regulating algorithm sets the regulator manipulated quantities for fuel metering device 28 and the throttle devices in such a way that a modification of the air-fuel ratio takes place to a rich setting, i.e. an excess of fuel. The speed with which the change between the lean and rich setting takes place is a function of the selected regulating parameters, the regulation path, and the dynamic behavior of first exhaust gas sensor 20. Accordingly, for given regulating parameters and a given regulation path, the period duration of the $\lambda$ oscillation is a measure of the dynamic behavior of first exhaust gas sensor 20, and can correspondingly be used to diagnose the dynamic behavior of first exhaust gas sensor 20.

For vehicle diagnosis, in the depicted vehicle diagnostic system 8, for example in diagnostic device 30, a regulating algorithm is implemented with which the dynamic behavior of a regulation path in internal combustion engine 10 can be monitored, including exhaust gas sensors 20, 24 as measurement elements, the engine block as actuating element, and control device 26 as regulator.

In an OBD test that tests the dynamic characteristic of first exhaust gas sensor 20, through diagnostic device 30 the fuel mixture could be deliberately made excessively rich in order to test whether first exhaust gas sensor 20 acquires this excessive richness, and whether the regulation loop including first exhaust gas sensor 20 reacts to this excessive richness within specified time limits. If, however, a slight enrichment of the fuel mixture is necessary due to the operating characteristic of vehicle 2, then the regulating loop including first exhaust gas sensor 20 will indeed react to the excessive richness, but not within the specified time limits. The OBD test will fail, and will have to be repeated.

In the case of too-frequent repetition of this OBD test, excessive consumption of fuel may occur that is due solely to this OBD test. Other OBD tests that alter the fuel mixture can be used for example in the diagnosis of catalytic converter 22 and in the diagnosis of the dynamic behavior of exhaust gas sensor 24 after catalytic converter 22. In addition to the increased fuel consumption, such OBD tests can also be damaging to the environment, because if they are carried out too often such active manipulations of the fuel mixture make the exhaust gas worse, which over time causes a worsened exhaust gas balance.

In order to avoid the above-named overconsumption of fuel and unnecessary environmental damage, the present embodiment proposes to investigate route 6 shown in FIG. 1 and to estimate on which path segments 32 vehicle 2 could have an operating characteristic suitable for a particular OBD test. Alternatively or in addition, individual path segments 32 can however also be recognized as unsuitable for particular OBD tests, whereupon the start of the corresponding OBD test is forbidden on these path segments 32.

The investigation of route 6 can take place adaptively, for example based on the recognition of whether this route 6 was already traveled. For this purpose, for example in a storage device 34 of vehicle 2 a table can be stored in which for example the steering angle of the vehicle is shown opposite a traveled path. If comparison of the path of current route 6 with the steering angle and vehicle speed correlates to the comparison stored in storage device 34, it can be inferred that the route has already been traveled. In addition, in storage device 34 driver profiles can be stored from which the driving behavior of the driver can be derived from the route.

Alternatively or in addition, the investigation of route 6 can also predictively, using a navigation system 36 or a near-field sensor 38 from which environmental and traffic data about route 6 can be derived. Here as well, the driving behavior of the driver can also be included in the investigation of route 6. For example, navigation system 36 could recognize traffic jams on route 6. On the basis of these recognized traffic jams, OBD tests could then be planned that would be carried out when vehicle 2 was at a standstill or in stop-and-go operation. In addition, OBD tests could also be avoided that could not be carried out in a traffic jam. Alternatively or in addition, near-field sensor 38 could be used to scan the environment around vehicle 2. For this purpose, near-field sensor 38 could for example be a camera having a connected image evaluation system. If for example a slow-moving vehicle in front of vehicle 2 is recognized, then for example an imminent braking process can be inferred that can be included in the planning of the vehicle diagnosis of vehicle 2.

Through the investigation of route 6, possible OBD tests over route 6 can be recognized, planned, and included in the operating strategy e.g. of internal combustion 10 in hybrid and in conventional drive designs. In this way, frequently interrupted OBD tests can be avoided, and the influence of the OBD tests on the selection of the operating point of the internal combustion engine in classical and hybrid drivetrain designs can be timely taken into account, which in the present embodiment results in a saving of fuel and/or improved exhaust gas characteristics. In this way, the execution of the OBD test and of the DIUMPR can be improved.

Figure 3:
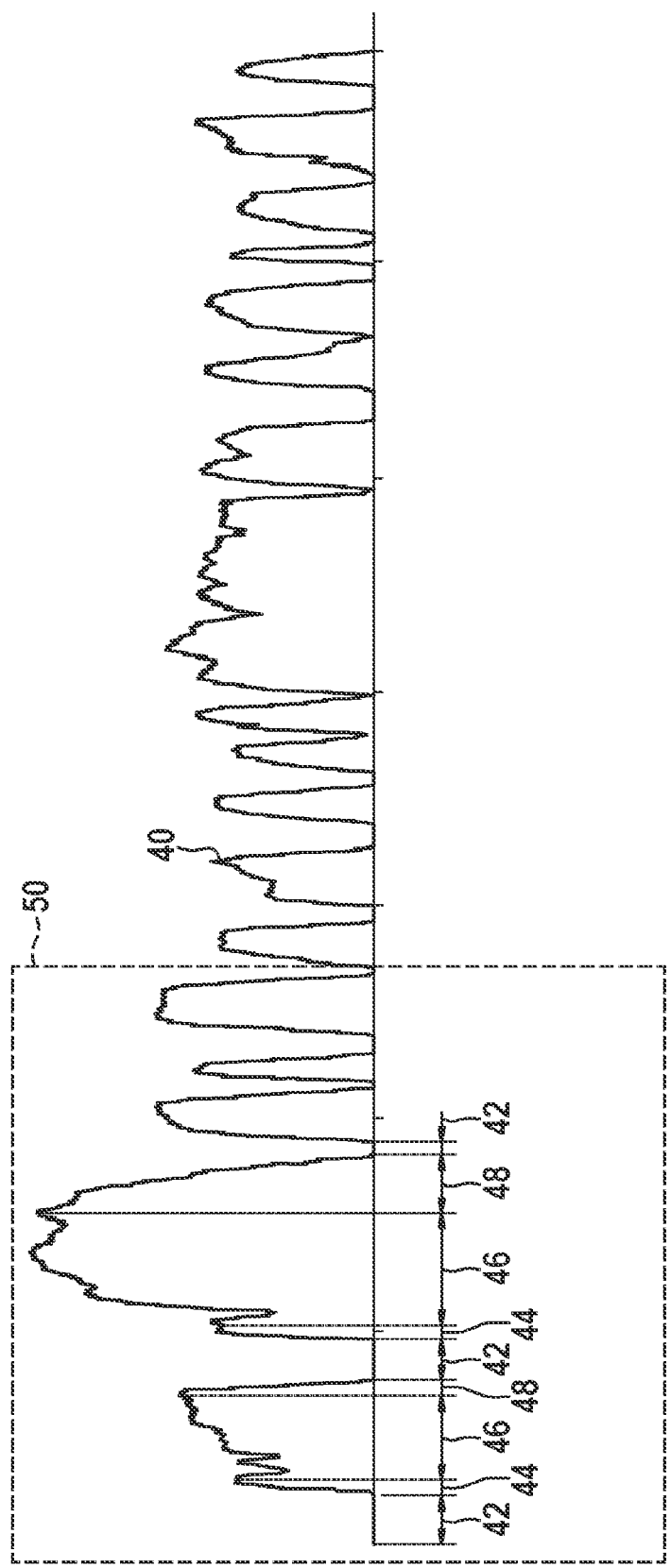
FIG. 3 shows an example of a temporal speed curve of the vehicle traveling on a roadway.
Figure 4:
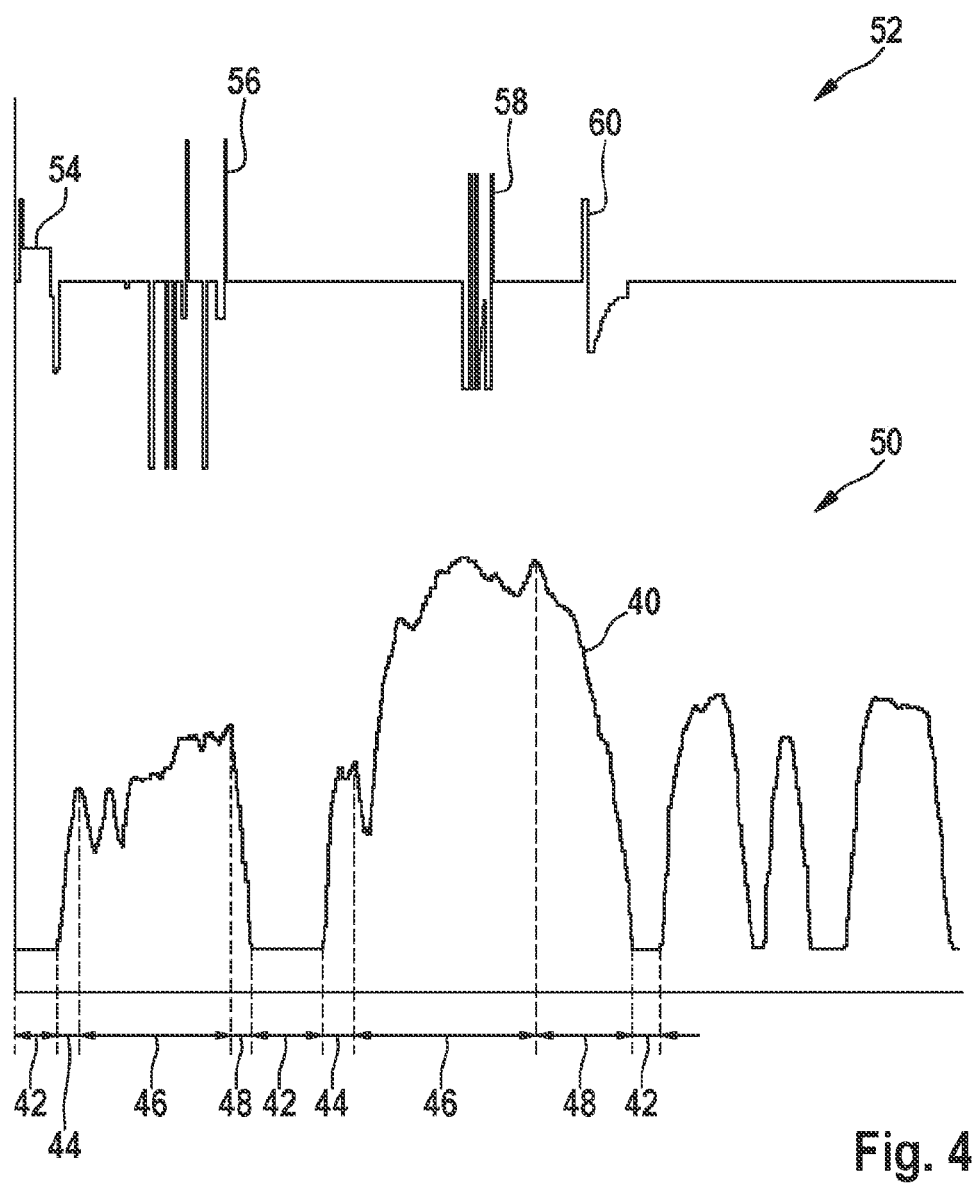
FIG. 4 shows a first example of a temporal mixture setting curve of the vehicle traveling on a roadway, shown opposite a part of the temporal speed curve of FIG. 3.
Figure 5:
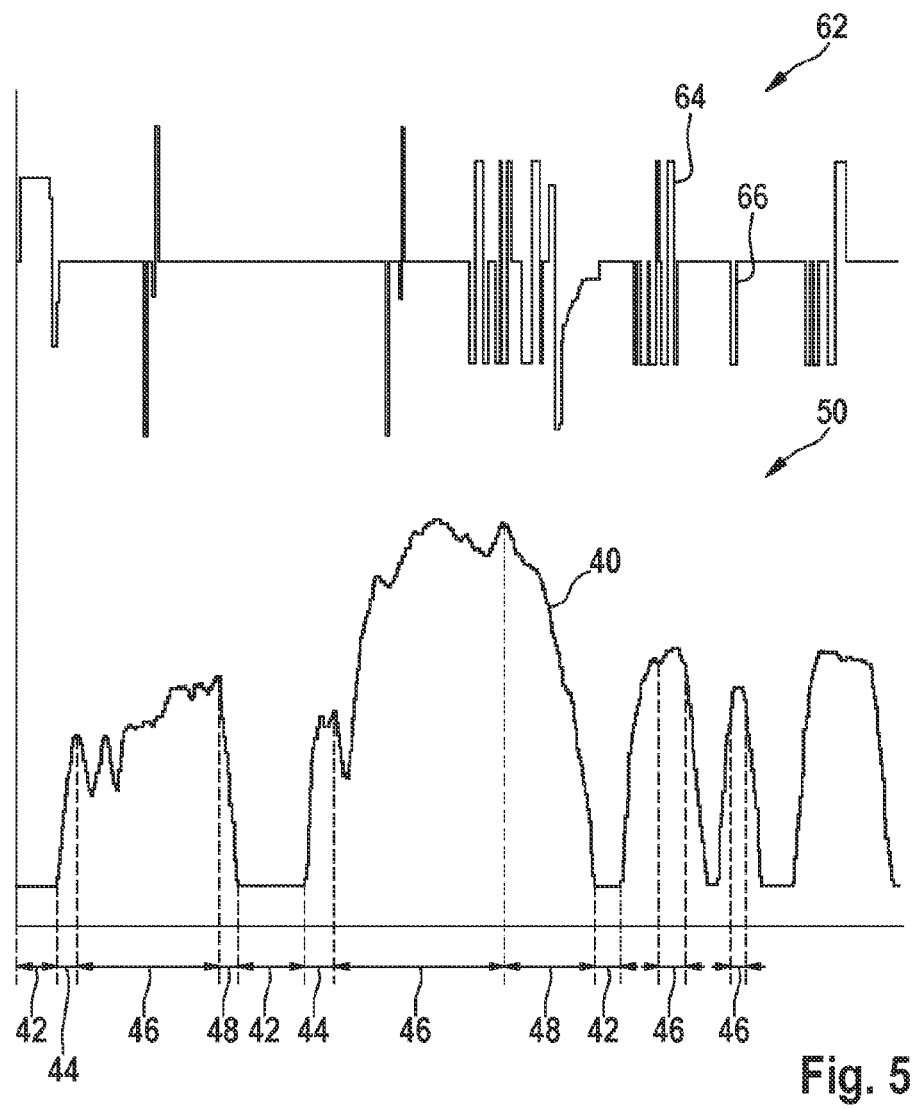
FIG. 5 shows a second temporal mixture setting curve of the vehicle traveling on a street, shown opposite a part of the temporal speed curve of FIG. 3.

On the basis of FIGS. 3 to 5, as an example the planning of some OBD tests is explained on the basis of a speed curve of vehicle 2 on route 6.

FIG. 3 shows, as an example of the operating characteristic of vehicle 2, a temporal expected speed curve 40 of vehicle 2 on route 6. Speed curve 40 can be predictively estimated and/or adaptively determined in the manner described above.

From speed curve 40, as expected operating characteristic of vehicle 2 first an initial standing phase 42 is recognized after the start of vehicle 2. After initial standing phase 42, vehicle 2 accelerates, in an acceleration phase 44, to an average travel speed that is not further referenced. This can for example be the acceleration after leaving the parking spot of vehicle 2 in a garage or parking lot. After acceleration phase 44, in a driving phase 46 the average speed is maintained over a period of time that can be foreseen via the predictive or adaptive determination of the speed curve 40, until vehicle 2, during a braking phase 46, is again braked to a standstill, for example because it is expected that the vehicle will have to stop at a traffic light. There then again follows a standing phase 42, correspondingly followed by an acceleration phase 44, a driving phase 46, and a braking phase 48. This sequence is repeated more or less regularly; in FIG. 3, for clarity the individual phases are not all referenced.

FIG. 4 shows a first example of a temporal mixture setting curve 52 of vehicle 2 traveling on route 6, shown opposite a part 50 of temporal speed curve 40 from FIG. 3.

In first standing phase 42, a first mixture setting 54 can be planned in order to heat the catalytic converter. In addition, during first driving phase 46 a second mixture setting 56 can be planned for the diagnosis of first exhaust gas sensor 20, and in second driving phase 46 a third mixture setting 58 can be planned for the diagnosis of catalytic converter 22, and in braking phase 48 following the second driving phase a fourth mixture setting 60 for thrust and clearing the catalytic converter can be planned, because in these phases the operating conditions of vehicle 2 are sufficiently stationary for the execution of the corresponding OBD test.

FIG. 5 shows a second example of a temporal mixture setting curve 62 of vehicle 2 traveling on route 6, shown opposite a part 50 of temporal speed curve 40 of FIG. 3.

In FIG. 5, it can be seen that in third and fourth driving phase 46, following second driving phase 46, the operating conditions of vehicle 2 are probably not sufficiently stationary for a long enough time to completely carry out a corresponding OBD test for diagnosing catalytic converter 22, so that here a corresponding mixture setting 64, 66 is correspondingly to be forbidden by the planning.

What is claimed is:

1. A method for determining a plan for a vehicle diagnosis in a vehicle, comprising:

estimating, via a processor, at least one operating characteristic of the vehicle on path segments, wherein the path segments are of a route traveled or to be traveled by the vehicle, wherein the operating characteristics are at least one of suitable and unsuitable for the vehicle diagnosis, which is an on-board-diagnostic (OBD) test;

determining, via the processor, a plan for performing the vehicle diagnosis based on a probability that the at least one estimated operating characteristic of the vehicle corresponds to an operating characteristic that is at least one of suitable and unsuitable for the vehicle diagnosis, wherein the operating characteristic suitable for the vehicle diagnosis is a function of a state of the vehicle which has to fulfill predetermined conditions for the vehicle diagnosis, wherein the probability that the estimated operating characteristic of the vehicle corresponds to an operating characteristic suitable for the vehicle diagnosis takes into account a probability as to whether the operating characteristic suitable for the vehicle diagnosis can be realized using auxiliary aggregates in the vehicle; and operating the auxiliary aggregates based on the determined plan and performing the vehicle diagnosis according to the determined plan.

2. The method as recited in claim 1, further comprising:
preventing the vehicle diagnosis if the probability that the estimated operating characteristic of the vehicle corresponds to the operating characteristic suitable for the vehicle diagnosis is below a specified threshold value.

3. The method as recited in claim 2, further comprising:
reading out the route to be traveled from a navigation device;
wherein the operating characteristic of the vehicle is estimated based on information provided by the navigation device regarding the route to be traveled.

4. The method as recited in claim 2, further comprising:
writing a vehicle log based on a route traveled by the vehicle, before the traveling of the route to be traveled;
wherein the operating characteristic of the vehicle is estimated based on the written vehicle log.

5. The method as recited in claim 2, wherein the operating characteristic of the vehicle is estimated based on an output signal of a near-field sensor attached to the vehicle.

6. The method as recited in claim 2, further comprising:
acquiring data regarding a behavior of a driver of the vehicle;
wherein the operating characteristic of the vehicle is estimated based on the acquired data regarding the behavior of the driver of the vehicle.

7. A device determining a plan for performing a vehicle diagnosis in a vehicle, comprising:
a control unit including a processor configured to perform the following:

estimating, via a processor, at least one operating characteristic of the vehicle on path segments, wherein the path segments are of a route traveled or to be traveled by the vehicle, wherein the operating characteristics are at least one of suitable and unsuitable for the vehicle diagnosis, which is an on-board-diagnostic (OBD) test; and determining, via the processor, a plan for performing the vehicle diagnosis based on a probability that the at least one estimated operating characteristic of the vehicle corresponds to an operating characteristic that is at least one of suitable and unsuitable for the vehicle diagnosis, wherein the operating characteristic suitable for the vehicle diagnosis is a function of a state of the vehicle which has to fulfill predetermined conditions for the vehicle diagnosis;

wherein the probability that the estimated operating characteristic of the vehicle corresponds to an operating characteristic suitable for the vehicle diagnosis takes into account a probability as to whether the operating characteristic suitable for the vehicle diagnosis can be realized using auxiliary aggregates in the vehicle; and operating the auxiliary aggregates based on the determined plan and performing the vehicle diagnosis according to the determined plan.

8. The device as recited in claim 7, wherein the vehicle includes a vehicle diagnostic system to monitor an internal combustion engine, having an engine block and an air supply duct to supply combustion air to the engine block, wherein an air quantity in the air supply duct is determinable using an air supply measurement device.

9. The device as recited in claim 8, wherein the exhaust gas of the internal combustion engine is conducted through an exhaust gas duct, in which is situated, in a flow direction of the exhaust gas, a first exhaust gas sensor before a catalytic converter and a second exhaust gas sensor after a catalytic converter.

10. The device as recited in claim 9, wherein the first exhaust gas sensor and the second gas exhaust gas sensor are connected to a control device, the control device being configured to calculate a fuel mixture from gas sensor data of the first exhaust gas sensor and the second gas exhaust gas sensor and air supply data of the air supply measuring device, and to control a fuel metering device configured to meter the fuel.

11. The device as recited in claim 10, wherein a diagnostic device is coupled to and/or in the control device, the diagnostic device being configured to perform the vehicle diagnosis by evaluating signals of the first exhaust gas sensor and the second gas exhaust sensor.

* * * * *